United States Patent
Lewis et al.

(10) Patent No.: US 6,611,815 B1
(45) Date of Patent: Aug. 26, 2003

(54) METHOD AND SYSTEM FOR PROVIDING ACCOUNT VALUES IN AN ANNUITY WITH LIFE CONTINGENCIES

(75) Inventors: Stephen H. Lewis, Fort Wayne, IN (US); Denis G. Schwartz, Fort Wayne, IN (US)

(73) Assignee: Lincoln National Life Insurance Co., Fort Wayne, IN (US)

( * ) Notice: Subject to any disclaimer, the term of this patent is extended or adjusted under 35 U.S.C. 154(b) by 94 days.

(21) Appl. No.: 09/753,408

(22) Filed: Jan. 2, 2001

Related U.S. Application Data

(60) Provisional application No. 60/174,206, filed on Jan. 3, 2000.

(51) Int. Cl.[7] ............................................. G06F 17/60
(52) U.S. Cl. ............................. 705/35; 705/36; 705/4
(58) Field of Search .................................. 705/4, 35, 36

(56) References Cited

U.S. PATENT DOCUMENTS

| | | | |
|---|---|---|---|
| 4,055,757 A | 10/1977 | Tillman et al. | |
| 5,291,398 A | 3/1994 | Hagan | |
| 5,631,828 A | 5/1997 | Hagan | |
| 5,644,727 A | * 7/1997 | Atkins | 705/40 |
| 5,752,236 A | 5/1998 | Sexton et al. | |
| 5,754,980 A | 5/1998 | Anderson et al. | |
| 5,761,441 A | 6/1998 | Bennett | |
| 5,893,071 A | 4/1999 | Cooperstein | |
| 5,926,792 A | 7/1999 | Koppes et al. | |
| 5,930,760 A | 7/1999 | Anderton et al. | |
| 5,933,815 A | * 8/1999 | Golden | 705/35 |
| 5,940,810 A | 8/1999 | Traub et al. | |
| 6,058,377 A | 5/2000 | Traub et al. | |
| 6,061,661 A | 5/2000 | Hagan | |
| 6,064,969 A | 5/2000 | Haskins | |
| 6,064,983 A | 5/2000 | Koehler | |
| 6,064,986 A | 5/2000 | Edelman | |
| 6,076,072 A | * 6/2000 | Libman | 206/232 |
| 6,085,174 A | 7/2000 | Edelman | |
| 6,105,865 A | 8/2000 | Hardesty | |
| 6,148,293 A | * 11/2000 | King | 705/35 |
| 6,275,807 B1 | * 8/2001 | Schirripa | 705/35 |

OTHER PUBLICATIONS

IRS private letter ruling 9237030; Jun. 16, 1992 [code sec. 72].*
Retirement Contribution Analyzer User Guide; Ernst & Young, LLP; Oct. 24, 1997; 19 pages.*
AnnuiSHARE™ Consumer Brochure, Version 1.20, Apr. 6, 1999; Cover: *AnnuiSHARE™ Lifetime Income Annuity; SHAREways to an enhanced and secure future in retirement*; (see inside cover, pp. 3–6, inside back cover and back cover).
*The Mechanics of Variable Annuitization*; by Jeffrey K. Dellinger, FSA, MAAA; Sep. 1994; Published in VARDS "Executive Series".

* cited by examiner

*Primary Examiner*—V. Millin
*Assistant Examiner*—Alain L. Bashore
(74) *Attorney, Agent, or Firm*—Barnes & Thornburg

(57) ABSTRACT

A data processing method for administering an annuity product having a guarantee of lifetime payments. The method includes establishing a charge for the guarantee of lifetime payments, determining an initial benefit payment and paying the initial payment to a beneficiary, determining a subsequent periodic payment, periodically determining an account value, and periodically paying the subsequent payment and reporting the account value to the beneficiary. A death benefit or cash surrender benefit may be provided, and either or both may be related to the account value. In certain embodiments, the account value is determined throughout the period between periodic reports to the beneficiary, and may be accessed upon demand by the beneficiary.

36 Claims, 4 Drawing Sheets

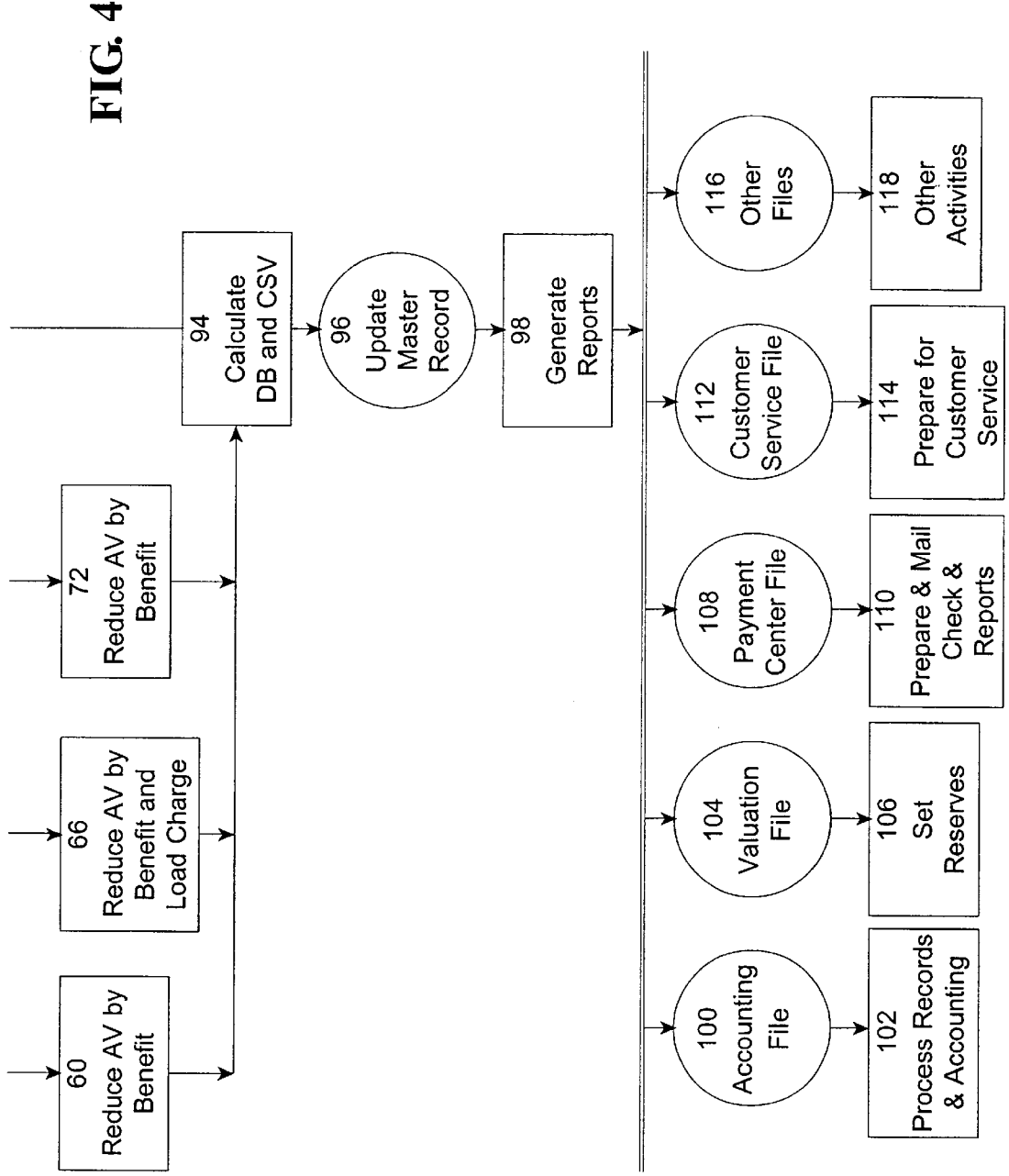

METHOD AND SYSTEM FOR PROVIDING ACCOUNT VALUES IN AN ANNUITY WITH LIFE CONTINGENCIES

BACKGROUND AND SUMMARY OF THE INVENTION

The present application is related to and claims priority to U.S. Provisional Patent Application, Ser. No. 60/174,206 (filed Jan. 3, 2000), entitled Method and System For Providing Account Values In An Immediate Annuity With Life Contingencies. The subject matter disclosed in this provisional application is hereby expressly incorporated into the present application.

FIELD OF THE INVENTION

The present invention relates generally to a data processing method and system for administering annuity retirement income benefits and, more particularly, to a data processing method and system for the efficient administration of both fixed and variable annuity products in the distribution, or payout, phase. The invention also relates to data processing and administrative systems used to administer such annuities that contain provisions which increase payments to the annuitant in the event specified contingencies occur, such as confinement in a long term care facility, or payment amounts falling below specified levels.

BACKGROUND OF THE INVENTION

Annuities typically serve the useful function of providing economic protection against the risk of longevity. An annuitant has the option of electing a life-contingent retirement income, thereby transferring the risk of outliving one's accumulated assets to the insurer.

A number of different kinds of annuities are available to meet the diverse needs of different individuals. These include deferred annuities and immediate annuities. In a deferred annuity, an individual is typically still in the "accumulation phase" of the annuity, amassing assets intended to sustain him or her during retirement years, when an earned wage from performing work is absent. In an immediate annuity, a lump sum of money is applied to purchase a series of retirement income benefit payments, with the first payment typically being made at the time of purchase, with subsequent benefit payments arriving each month thereafter.

The length of the term of the retirement income benefit payments is determined by the annuity benefit option elected by the annuitant. One type of annuity benefit option can provide lifetime income for the annuitant, regardless of how long he or she survives. Another type provides a similar benefit, but covers two lives, typically the annuitant and spouse.

Various types of additional guarantees can be attached to these life-contingent annuity benefit options. These include an option that guarantees the insurer will make at least a minimum number of monthly payments, typically 120 or 240. Another type of option guarantees that the insurer will pay out in benefits at least as much value as was applied to purchase the annuity. Increasing the guarantees typically has the effect of reducing the amount of the annuity benefit payments.

Non-life-contingent annuity benefit options are also available. For example, an annuity benefit that makes monthly payments for a specified period of time, such as thirty years, and then terminates is available.

Another distinction between the types of annuities available is whether it is classified as a "fixed annuity" or a "variable annuity." In a fixed annuity, the insurer bears the investment risks. In a deferred fixed annuity the insurer guarantees a rate of interest applicable to each annuity deposit. The guarantee applies for a specified period of time, often one year, and is then reset periodically, moving in an amount and a direction that correlate with fixed-income investment yields available to the insurer in the capital markets.

In a variable annuity, the annuity contract owner bears the investment risk during the accumulation phase of the annuity. The annuitant(s) bear(s) the investment risk during the distribution, or payout, phase of the variable annuity. The individual(s) (owner and/or annuitant, who can be the same person) controlling the variable annuity typically have a choice of funds in which they can direct that annuity deposits be invested. These funds typically each represent one asset class, such as large capitalization U.S. common stocks, corporate bonds, money market instruments, or international stocks.

In a fixed annuity, the account value during the accumulation phase only increases with time. In a variable annuity, the account value during the accumulation phase can either increase or decrease with time, depending on the performance of the fund(s) in which the annuity contract owner has directed that deposits be invested. The hope and expectation, but not guarantee, is that investments in the riskier asset classes typically associated with a variable annuity will provide long-term accumulated values superior to those of a fixed annuity. As annuities are geared toward providing retirement income, there typically is a long-term holding period.

FIG. 1 shows a chart and graph which compares a typical contract value under a variable annuity to a contract value under a fixed annuity earning 5% annually. As illustrated in the second column of the chart of FIG. 1, the net investment value for the variable annuity may vary and may be positive or negative.

In a fixed annuity, the dollar amount of each annuity benefit payment during the distribution phase is known with certainty at the time the account value is applied to the purchase of an annuity benefit option. (The point in time where the accumulated value of the deferred annuity is exchanged for a promise by the insurer of a series of future retirement income benefit payments is termed "annuitization.") The fixed annuity benefit payments are typically level forever, such as $1,000 per month, or increase by a specified percentage, such as $1,000 per month, increasing by 3% each year. However, fixed annuity benefit payments are definitely determinable as to dollar amount at the point where the annuity contract owner elects the annuity benefit option from among his or her choices.

In a variable annuity, the dollar amount of each annuity benefit payment during the distribution phase is not known with certainty at the time the account value is applied to the purchase of an annuity benefit option. Rather, the annuitant(s) typically receive(s) the value of a specified number of annuity units each month. For example, if the annuitant is entitled to the value of 500 annuity units per month and the annuity unit value on the valuation date that determines the annuitant's benefit is $2.00, the annuitant receives an annuity benefit payment of $1,000 that month. If, on the next succeeding valuation date that determines the annuitant's benefit payment, the annuity unit value is $2.05, the annuitant receives an annuity benefit payment of $1,025 that month. If the annuity unit value on the subsequent valuation date is $1.95, the annuitant receives $975 that month.

In contrast to the fixed annuity benefit payments, variable annuity benefit payments are definitely determinable at the time of the annuity option election as to the number of annuity units that will determine the amount of the benefit payment on each future payment date. The variable annuity benefit payments are not definitely determinable as to dollar amount at the point when the annuity contract owner elects the annuity benefit option from among his or her choices.

For variable annuities, "accumulation units" are the measure of value during the accumulation phase. Each specific fund or "subaccount," such as a domestic common stock fund, has an accumulation unit value that increases daily by realized and unrealized capital appreciation, dividends, and interest, and that decreases each day by realized and unrealized capital losses, taxes, and fees. The worth of a variable annuity contract owner's account is the number of accumulation units owned in each fund multiplied by the accumulation unit value of each fund as of the most recent valuation date (typically daily).

For variable annuities, "annuity units" are the measure of value during the distribution phase. "Annuity units" work very much like accumulation units, with one exception. Annuity units have built into them an assumed interest rate (AIR)—such as 3%, 4%, or 5%—at which a fund is assumed to grow annually in value. Thus, if a fund with a 5% AIR actually grew at 5% during a year, the annuity unit value for that fund would remain unchanged.

To the extent the fund performance exceeds the 5% AIR, the annuity unit value increases. To the extent fund performance falls short of the 5% AIR, the annuity unit value decreases. Since the monthly benefit payment to the annuitant is the number of annuity units payable times the annuity unit value, fund performance in excess of the AIR causes the monthly annuity benefit payments to increase. Fund performance less than the AIR causes the monthly annuity benefit payments to decrease.

$$Benefit_{t+1} = Benefit_t \times \frac{1+i}{1+AIR}$$

where: $Benefit_{t+1}$=dollar amount of variable annuity benefit at time t+1

$Benefit_t$=dollar amount of variable annuity benefit at time t i=actual fund performance during period t to t+1 (as a %)

AIR=assumed investment rate during period t to t+1 (as a %)

Variable annuity benefit options of sufficiently long duration have historically provided an inflation hedge to retirees superior to that available under fixed annuities.

While annuitization guarantees lifetime income, the contractholder loses liquidity (and, depending on the type of annuity, some or all of the death benefit implied by full liquidity). During the accumulation phase, and subject to surrender charges, the contractholder has full access to the account value. After annuitization, the contractholder typically cannot withdraw account value in excess of that provided in monthly payments, and the death benefit available is either zero or limited in some way (e.g., paid only as a continuation of payments throughout the certain period). Because of this loss of liquidity and reduced (or nonexistent) death benefit, many deferred annuity contractholders wanting periodic income choose not to "annuitize" (convert to an immediate annuity). Instead, they make systematic withdrawals from their annuity while maintaining it in its active, or accumulation, phase.

Systematic withdrawal programs from active, unannuitized deferred annuity contracts are an alternative mechanism (i.e., an alternative to annuitization) for distributing retirement income to contractholders. While these programs provide full liquidity, that liquidity requires some tradeoffs. For example, if withdrawals are set at a specified dollar level, then these distributions can fully deplete the account value. And, by definition, if withdrawals are established so as to pay out earnings and principal over a specified number of years, then these distributions will fully deplete the account value over this period. In either case, the contractholder can outlive the retirement income provided by this method of systematic withdrawal. Alternatively, if withdrawals are set as a percent of account value, then the period of distribution may be extended indefinitely, but a meaningful level of monthly retirement income may not be achieved. For example, if the percentage chosen is too high, the bulk of the account value will be distributed in the early years, leaving a much smaller account value base against which the same percentage will be applied, eventually resulting in inconsequential monthly retirement income payments.

SUMMARY OF THE INVENTION

The present invention provides a method for distributing income from an annuity in a manner that is superior to both annuitizations and systematic withdrawal programs. It is superior because the method joins the two programs seamlessly so as to provide lifetime income annuities which, for example, may provide systematic withdrawals of principal and earnings over a specified number of years and, after systematic withdrawals have exhausted the account value, continue periodic payments for the remaining life of the annuitant. When death of the annuitant(s) occur(s), any remaining account value would typically be paid to the annuitant's beneficiary(ies). The annuitant(s) or owner(s) can be given access to the account value during the lifetime of the annuitants. For example, terms of the contract may permit the annuity to be surrendered for its commuted value, where commuted value is defined in the contract as the current account value less applicable surrender charges, if any. Also, the contract could permit partial withdrawals of, or additional deposits to, the account value with appropriate adjustment to future income benefits.

In addition to income benefits, certain embodiments of the invention described here can be used to deliver morbidity (and other insurance) benefits. For example, the contract may include a long-term care (LTC) benefit that provides additional monthly benefits during a period when the annuitant is unable to perform specified "activities of daily living." The benefit may further provide that these additional benefits are deducted from the account value in the same way that regular monthly benefits are deducted. In this instance, there is a cost to the insurance company for providing this benefit only if the annuitant receiving LTC benefits is still alive when the account value is exhausted. As a result, costs, and therefore premiums, for this benefit can be kept low. As another example, the contract could provide that, regardless of investment performance, each periodic payment will not be less than some specified amount. Again, because the account value is reduced by actual payments, benefits under this feature carry a cost for the insurance company only if the annuitant is still alive when the account is exhausted.

The costs associated with continuing periodic payments to the annuitant after such payments have exhausted the account value is covered either explicitly or implicitly by any of a variety of means. For example, the charge for this benefit could be an asset charge, such as 0.5% annually, applied against the account value. Alternatively, the charge could be a load, such as 5%, applied against the initial deposit, or it could be an amount, such as 7% of the current periodic payment, deducted from the account value each time a periodic payment is made.

In one way or another, the charges described above reduce the account value, and the higher the charge, the greater the reduction. Since the benefits paid on death or surrender are typically related to the account value, higher charges act to reduce these benefits. Because these benefits are reduced by higher charges, the level of periodic payments increases with higher charges. Thus, within limits, the invention described here permits programs where contractholders can elect the level of periodic payment to be received in relation to each $1,000 of initial deposits. For example, a charge in the form of a 10% initial load will result in higher periodic payments than those associated with a 5% initial load. However, death and surrender benefits associated with the 10% load will be less than those associated with the 5% load. Contractholders can choose between these two levels of charges (and, potentially, an unlimited number of other levels) to suit their preferences in regard to income level versus death and surrender benefits.

Certain embodiments of the present invention provide immediate annuities with life contingencies which are superior to other forms of immediate annuities with life contingencies. Unlike these other forms, these embodiments permit contractholders to "see their money." Specifically, they embody an account value mechanism that enables death benefits and surrender benefits to be determined, and reported periodically, on the same basis as during the accumulation (deferral) phase of an annuity. Unlike other immediate annuities with life contingencies, these benefits are related directly (typically equal) to an account value which is simply the account value at the end of the prior period increased (decreased) by net investment earnings (losses) during the current period and reduced by the amount of any income payments (and charges and "excess" withdrawals) during the current period. For example, the account value at the end of the prior month is $95,000.00, net investment earnings for the month are $900.00, and the amount of the periodic (monthly) income payment is $1,500.00, then the current account value would be $94,400.00.

The invention described here is applicable to both variable annuities and fixed annuities. In the case of variable annuities, changes in payments from period to period are governed by the same formula as is used for life annuities. The invention is further applicable to annuities containing contingencies on either one life or more than one life (e.g., "joint and survivor").

While some embodiments of the invention will include contract provisions in one immediate annuity contract, it is possible to split the provisions between two contracts. Doing so would permit the invention to be applied to mutual fund (or any liquid investment) systematic withdrawal programs, with charges assessed against mutual fund values funding a deferred annuity contract which will continue income payments for life once mutual fund values have been exhausted by periodic income payments.

Certain embodiments of the present invention provide a data processing method and apparatus for the determination and administration of annuity and other benefit payments, charges, and account value as described above and as will be described more fully below. One embodiment of the invention provides a data processing method for administering an annuity product having a guarantee of lifetime payments, comprising the steps of establishing a charge for the guarantee of lifetime payments, determining an initial benefit payment to be paid to a beneficiary, determining a subsequent periodic payment, periodically determining an account value, and periodically paying the subsequent payment and reporting the account value to the beneficiary. The charge for the guarantee of lifetime payments may be established in various ways, including determining a front end charge and deducting the front end charge from an initial deposit, determining a charge to be deducted from each periodic benefit payment, or determining an asset charge and periodically deducting the asset charge from the account value.

In those instances in which a front end charge is determined and deducted from an initial deposit, the front end charge is determined based upon at least one of a plurality of factors, including age, sex, liquidity, and interest rates. The initial benefit payment is preferably determined by the following formula:

$$\text{Initial benefit} = \text{Deposit} \times (1 - \text{Charge}) \bigg/ \left[ \sum_{t=0}^{12N-1} 1/(1+AIR)^{t/12} \right]$$

Where: Charge=charge for lifetime guarantee (as a percent of deposit)

N=number of years account value is maintained

AIR=assumed investment rate (annual).

Subsequent periodic payments may be determined in a number of ways, including setting the subsequent benefit payment equal to the initial benefit payment, setting the subsequent benefit payment equal to the immediately preceding benefit payment (which may be the initial payment), or setting the subsequent benefit payment equal to the immediately preceding benefit payment increased by a predetermined percentage. The subsequent periodic benefit payment may also be determined by the following formula:

$$\text{Benefit}_{t+1} = \text{Benefit}_t \times (1+I)/(1+AIR)$$

Where: $\text{Benefit}_{t+1}$=dollar amount of variable annuity benefit at time t+1

$\text{Benefit}_t$=dollar amount of variable annuity benefit at time t

I=actual fund performance during period t to t+1 (as a %)

AIR=assumed investment rate for the period t to t+1 (as a %).

In embodiments where the charge for the guarantee of lifetime payments is a charge to be deducted from each payment, the initial benefit payment may be determined by the following formula:

$$\text{Initial benefit} = \text{Deposit} \times (1 - \text{Charge}) \bigg/ \left[ \sum_{t=0}^{12N-1} 1/(1+AIR)^{t/12} \right]$$

Where: Charge=level charge for lifetime guarantee (as a percentage of each benefit payment)

N=number of years account value is maintained.

AIR=assumed investment rate (annual).

As with the previous embodiment, the subsequent periodic benefit payments may be determined by a variety of methods, including those described above.

In one alternative embodiment in which the charge for the guarantee of lifetime payments is deducted from each benefit payment, the initial benefit payment is determined by the following formula:

$$\text{Initial benefit} = \text{Deposit} \bigg/ \left[ \sum_{t=0}^{12N-1} 1/(1+AIR)^{t/12} \right]$$

Where: AIR=Assumed Investment Rate (Annual)
N=number of years account value is maintained. In this embodiment, the subsequent periodic benefit payment may be determined by the following formula:

Subsequent Benefit$_{t+1}$=Gross Benefit$_{t+1}$-Charge

Where: Gross Benefit$_{t+1}$=Gross Benefit$_{t+1}$×(1+1)/(1+AIR)
Gross Benefit$_{+1}$dollar amount of gross variable annuity benefit at time t+1
Gross Benefit$_{t=}$dollar amount of gross variable annuity benefit at time t
I=actual fund performance during period t to t+1 (as a %)
AIR=assumed investment rate for the period t to t+1 (as a %)
Charge=level dollar charge from each benefit payment for lifetime guarantee In other embodiments, the charge for the guarantee of lifetime payments is an asset charge periodically deducted from the account value. In one particular embodiment, the step of deducting the asset charge from the account value includes the step of applying a lower credit rating in the periodic determination of the account value. In any of these embodiments, the initial benefit payment may be determined by the following formula:

$$\text{Initial benefit} = \text{Deposit} \bigg/ \left[ \sum_{t=0}^{12N-1} 1/(1+AIR)^{t/12} \right]$$

Where:
N=number of years account value is maintained.
AIR=assumed investment rate (annual).

As before, the subsequent periodic payments may be determined by a variety of methods.

In other embodiments, the system and method of the present invention include providing either one or both of a death benefit and a cash surrender benefit. Either or both may be related to the account value. For example, in one embodiment, the death benefit is equal to the account value, and the cash surrender benefit is equal to the account value reduced by a surrender charge.

In certain embodiments of the invention, the account value is periodically determined by the following formula:

Account value$_t$=Account value$_{t-1}$-Withdrawals$_t$-Gross Benefits$_t$+Deposits$_t$+Earnings$_t$ Where: Earnings$_t$=interest credited (fixed annuity) or investment return (variable annuity)
Gross Benefits$_t$=Benefits$_t$+Charges.

In these or other embodiments, the account value may be determined throughout the time between periodic reports to the beneficiary, and may be accessed by demand of the beneficiary (for instance, via telephone or computer network).

In certain embodiments, the system and method of the present invention provides an annuity product which has a long term care insurance benefit. In these embodiments, a charge for the long term care insurance benefit is determined. This charge may be determined in the same (or similar manner) as the charge for the guarantee of lifetime payments.

Certain embodiments of the invention may provide for partial withdrawals or additional deposits by the beneficiary. In such embodiments, the system and method may include redetermining the subsequent periodic benefit payment (and possibly other values associated with the account) in the event of a partial withdrawal or additional deposit.

Other objects, advantages and novel features of the present invention will become apparent from the following detailed description of the invention when considered in conjunction with the accompanying drawings.

BRIEF DESCRIPTION OF THE DRAWINGS

FIG. 4 is a continuation of the flow chart of FIG. 3.

DETAILED DESCRIPTION OF THE DRAWINGS

Figure 1:
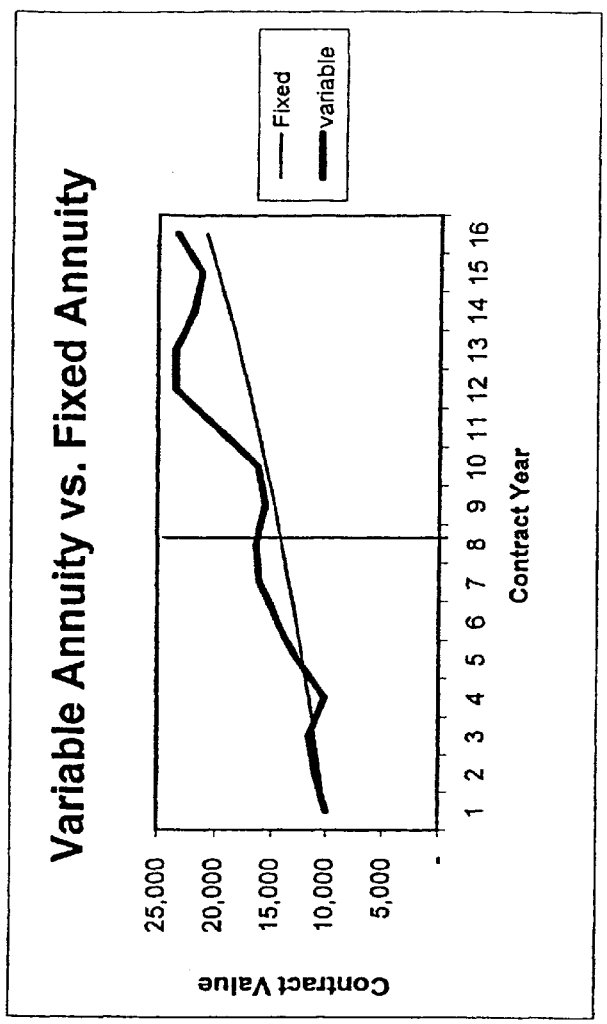
FIG. 1 shows a chart and graph illustrating contract values under both variable and fixed annuities.

FIG. 1 shows a chart and graph which illustrates and compares a contract value under a variable annuity to a contract value under a fixed annuity. In the example of FIG. 1, the fixed annuity earns 5% annually. The net investment return under the variable annuity can vary, as illustrated in column two of the chart. As previously noted, the hope and expectation is that, over time, the returns associated with a variable annuity will be greater than those associated with a fixed annuity. However, there is no guarantee that will occur.

Figure 2:
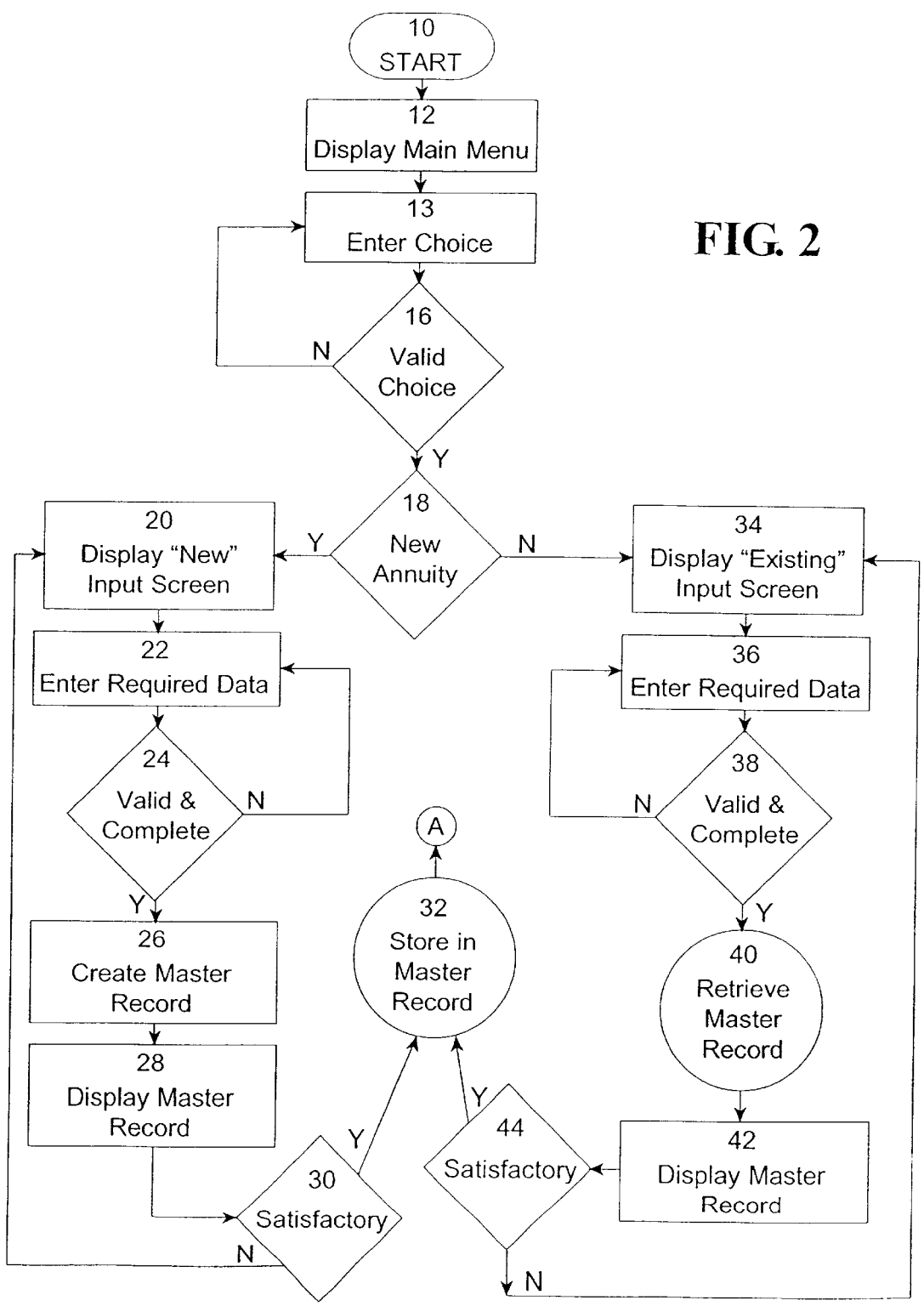
FIG. 2 is a flow chart illustrating a portion of a computerized method of practicing an embodiment of the present invention.

FIG. 2 is a flow chart which illustrates a portion of a computerized method of practicing one embodiment of the present invention. More particularly, FIG. 2 is an illustrative embodiment of steps taken to collect data which is used in the remainder of the process, as described in more detail below. For a new annuity, the data collected through the individual steps illustrated in FIG. 2 may be entered manually at a computer terminal or equivalent input device, or electronically, or in any other manner which is customary at present or in the future. For an existing annuity, the data will generally be retrieved from an existing contract master record, or other file.

The process may be initiated (block 10) either manually at a work station, or automatically in a batch cycle. In either case, a main menu is displayed (block 12) or provided, offering a number of possible operations. A choice may be entered by an operator or emulator (block 14). The choice may be validated as indicated in FIG. 2 (block 16).

After a value choice has been selected, the system determines whether the subject annuity is a new annuity or an existing annuity (block 18). For a new annuity, the process proceeds to display a new annuity input screen (block 20). This screen contains entry fields for items such as: information regarding the annuitant, owner and/or beneficiary; information regarding type of annuity chosen, including relevant dates and amounts; information on interest and mortality guarantees to be used in the subsequent calculations; and other related information. This data is entered (block 22) and checked for validity and completeness (block 24). If the data is valid and complete, as master record is created (block 26). The fields of this master record are populated with the data entered in step 22. The new master record is then displayed (block 28) for visual checking by an operator. If the data is deemed to be satisfactory (block 30), the master record is stored in a master record file (block 32). If th data is not satisfactory, the process repeats as indicated in FIG. 2.

Referring again to step 18, if the system determines that an existing annuity is to be dealt with, processing proceeds to display the existing annuity input screen (block 24). This screen contains entry fields for items such as: contract number; annuitant identification; and other items associated with the existing annuity contract. New data is entered (block 36) via the existing annuity input screen, and such new data is checked to determine validity and completeness (block 38). The master record associated with the existing annuity contract is retrieved (block 40) and displayed (block 42) for viewing by an operator. If and when the master record, as updated by the newly inputted data, is satisfactory (block 48), any updated data is stored in the master record (block 32).

Figure 3:
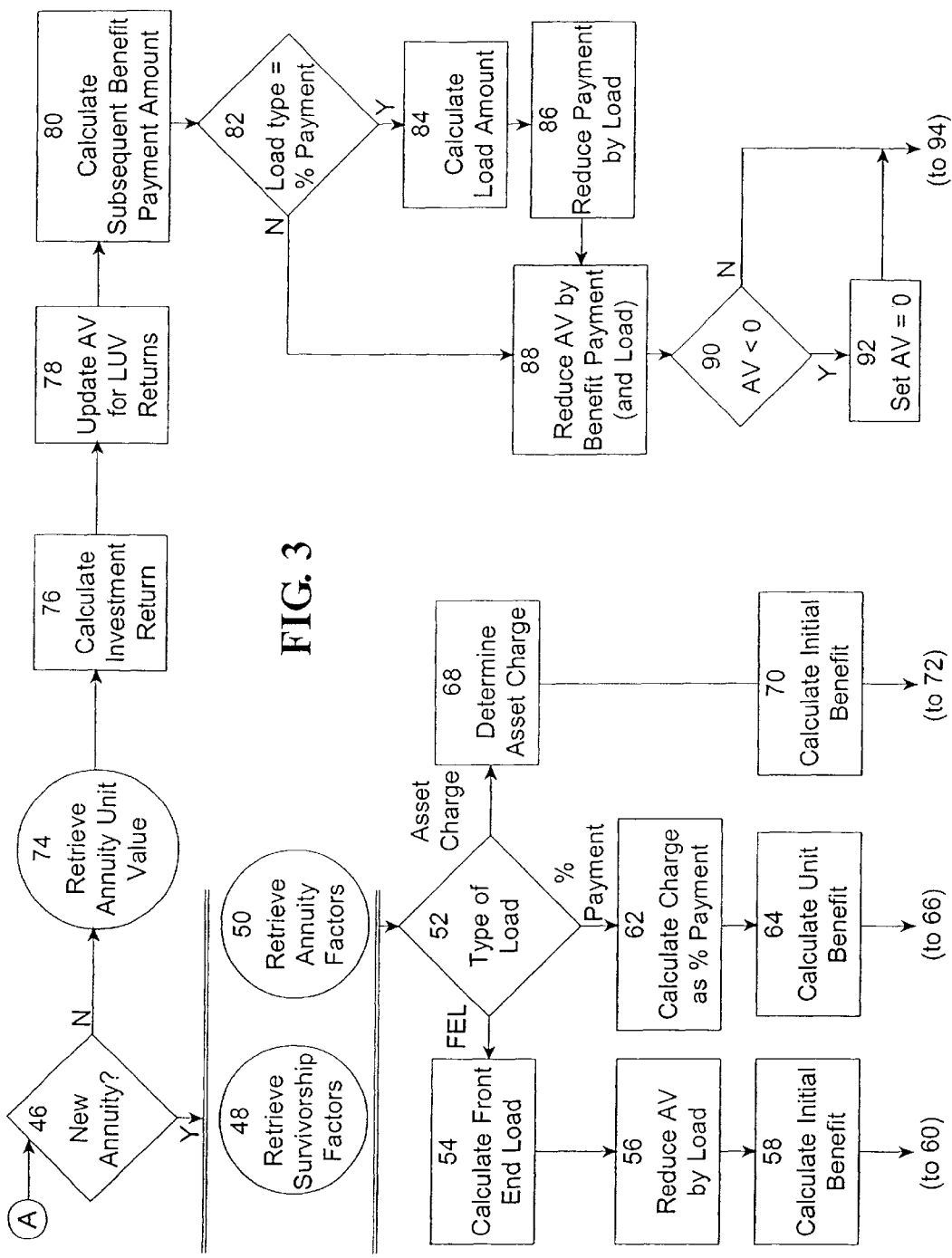
FIG. 3 is a flow chart which further illustrates the computerized method of FIG. 2.

FIGS. 3 and 4 illustrate the next step in the overall process of the present invention. That step is calculation of loads and initial benefit payments, subsequent benefit payments, account values, death benefits and cash surrender benefits. More particularly, the flow charts of FIGS. 3 and 4 illustrate one embodiment of a computer-based process for calculating these values and benefits.

The first step in FIG. 3 is to determine if this is a new annuity contract (block 46). For a new contract, survivorship factors (block 48) and annuity factors (block 50) are retrieved. These data are typically stored in files used for other purposes, although duplicate or dedicated purpose files may be created to hold such information for use in these calculations- The process of FIG. 3 then checks for the type of load block 52) the contract holder selected in step 26. If the contract holder chose a front-end load, the amount of the front-end load is calculated (block 54). The deposit amount is reduced by the front-end load (block 56) as is the account value. The initial benefit amount is then calculated (block 58) and the account value is further reduced by this amount (block 60—See FIG. 4). Going back to block 52, if the contract holder chose a load that is a percent of each periodic payment, the amount of the charge is calculated (block 62). Knowing this charge, the initial benefit amount is calculated (block 64). The periodic payment (including the load charge) is deducted from the deposit to form the account value (block 66—See FIG. 4). Going back to block 52, if the contract holder chose asset charges for the lifetime benefits, these charges are determined (block 68—See FIG. 4). Knowing this, the initial benefit amount is calculated (block 70). This benefit amount is deducted from the deposit to update the account value (block 72).

Returning to step 46, if the contract is not new, normal monthly processing occurs. Having retrieved the base contract information in block 40, annuity unit values are retrieved (block 74). Using the unit values, the investment return is calculated (block 76). The account value is then updated for interest and/or appreciation (block 78). Also from information retrieved in step 40, the subsequent benefit amount is calculated (block 80). The process then checks the load type for percent of periodic payment (block 82). If the contract has a percent of periodic payment charge, the load amount from the payment is calculated (block 84). This amount reduces the current periodic payment the contract holder will receive (block 86). The account value calculated in block 78 is then decreased by benefit payments aid, if present, loads (block 88). A check is made to see if the account value has been exhausted (block 90). If the account value <0, the account value is set to 0 (block 92). With reference to FIG. 4, knowing the account value, death benefits and cash surrender values are calculated (block 94) the master record file is updated (block 96) and reports are generated (block 98). These reports create accounting files (block 100) to account for the transactions (block 102), valuation files (block 104) to set reserves (block 106), payment center files (block 108) to prepare and mail checks and reports (block 110), customer service files (block 112) for customer service enquiries (block 114) and any other necessary files (block 116) for other activities (block 118).

While the preferred embodiment of the invention would be an individual variable annuity that provides the items listed above, the invention equally applies to both fixed and variable annuities, individual and joint annuities, and combinations of an annuity and mutual funds.

One aspect of the invention provides that benefit payments will be paid for a designated number of payments (during which period the annuity has an account value) and, if the owner is living at the end of that period, that payments will continue thereafter as long as the owner is alive. The structure of this payment guarantee is similar to that provided by a typical immediate annuity with life contingencies. The invention differs from the typical immediate annuity in that an account value is maintained and reported periodically to the annuitant and (in some embodiments) in that a death benefit and cash surrender benefit are related to this account value.

In certain embodiments of the present invention, the cost of the lifetime guarantee may be charged by one or more of three methods. The first method is a front-end charge, or "premium load," which is deducted from the owner's deposit at the time of deposit. For example, the charge might be 5% of the deposit, so that if the owner deposits $50,000, a charge of $2,500 would be deducted and the balance of the deposit ($47,500) would be paid into the account value. The second method is a charge which is deducted from each benefit payment as it is paid. For example, the level charge might be 10% of each payment, so that if a given benefit payment is $1,000, a charge of $100 would be deducted, and the balance of the benefit payment ($900) would be paid to the owner. The third method is an asset charge which is deducted daily from the account value. The charge under this method is analogous to the typical Mortality and Expense risk charge ("M&E charge") contained in deferred and immediate variable annuities. In fact, this charge would be added to the M&E charge if the annuity is a variable annuity, or subtracted from the crediting rate if the annuity is a fixed annuity. For example, the annual asset charge might be 0.25% of the average daily account value.

Certain embodiments of the present invention provide mechanisms for determining the initial benefit payment which are different from the mechanisms for determining benefit payments under typical immediate annuities. The exact formula for determining the initial benefit payment could depend on many factors, but primarily depends on the following items: the charging method (described above), the length of the period during which an account value will be maintained (the "liquidity period"), the age and gender of the owner/annuitant, the fixed or variable nature of the annuity, and the guaranteed interest rate or assumed interest rate (AIR).

In certain embodiments (for example, those associated with a front end charge for guarantees), the initial benefit may be determined by the following formula:

$$\text{Initial benefit} = \text{Deposit} \times (1 - \text{Charge}) / \text{Annuity Factor}$$

Where: Charge=single charge for lifetime guarantee

Annuity Factor=period certain annuity for N years

N=number of years account value is maintained

Under a fixed annuity, subsequent benefit payments are taken into account in the annuity factor used in the formula and are typically equal to the initial benefit. Alternatively, benefit payments may follow a predetermined increasing pattern (for example, benefits increase by 3% each year). Under a variable annuity, subsequent benefit payments are determined by the following formula:

$$\text{Benefit}_{t+1} = \text{Benefit}_t \times (1+I)/(1+\text{AIR})$$

Where: $\text{Benefit}_{t+1}$=dollar amount of variable annuity benefit at time t+1

$\text{Benefit}_t$=dollar amount of variable annuity benefit at time t

I=actual fund performance during period t to t+1 (as a %)

AIR=assumed investment rate for the period t to t+1 (as a %)

In other embodiments (for example, those associated with a level periodic charge), the initial benefit may be determined by the following formula:

$$\text{Initial benefit} = \text{Deposit}/[(1-\text{Charge}) \times \text{Annuity Factor}]$$

Where: Charge=level charge for lifetime guarantee (as a percent of each benefit payment)

Annuity Factor=period certain annuity for N years

N=number of years account value is maintained

For a fixed annuity, subsequent periodic benefit payments in these embodiments would typically be level, as explained above. Under a variable annuity, the formulas used to determine subsequent payments would be the same as described above, except that the charge would be deducted from each benefit payment before being sent to the owner/annuitant. In this regard, one might distinguish between a "gross" benefit payment and a "net" benefit payment and the formulas above would apply where the term "$\text{Benefit}_t$" is interpreted as the gross benefit payment.

In embodiments which incorporate an asset charge, the following formula may be used:

$$\text{Initial benefit} = \text{Deposit}/\text{Annuity Factor}$$

Where: Annuity Factor=period certain annuity for N years

N=number of years account value is maintained.

In such instances, the charge for the lifetime guarantee may be deducted through the application of a lower crediting rate (for a fixed annuity) or through a daily asset charge on the account value (for a variable annuity). Under a fixed annuity, subsequent benefit payments would typically be level, as explained above. Under a variable annuity, however, the daily asset charge has the impact of reducing the net investment performance and thereby reducing all subsequent benefit payments. The formula for subsequent benefit payments is similar to, but not identical to, that used above:

$$\text{Benefit}_{t+1} = \text{Benefit}_t \times (1+I)/(1+\text{AIR})$$

Where: $\text{Benefit}_{t+1}$=dollar amount of variable annuity benefit at time t+1

$\text{Benefit}_t$=dollar amount of variable annuity benefit at time t

I=actual fund performance during period t to t+1 (as a %), reduced by the daily asset charge for the guarantee AIR=assumed investment rate for the period t to t+1 (as a %)

The present invention differs in one respect from prior art immediate annuities with life contingencies in that it provides an account value. The typical immediate annuity with life contingencies provides the payments guaranteed by the contract, but does not maintain an account value. Some immediate annuities provide a death benefit that guarantees payments will be made for a certain period even if the annuitant dies, or that payments will continue at least until the total initial premium has been repaid. Some immediate annuities with life contingencies also allow a commutation of future payments to be paid as a type of cash surrender value, but such commutation is calculated using interest and mortality factors applied to future benefits. In certain embodiments of the present invention, an account value is maintained and any death benefit or cash surrender benefit is related to this account value. By reporting this account value periodically to the annuitant, the annuitant knows at all times the lump sum value of cash surrender and death benefits and how investment performance and annuity payments have affected these values.

The account value at any time "t" is determined as follows:

$$\text{Account value}_t = \text{Account value}_{t-1} - \text{Withdrawals}_t - \text{Gross Benefits}_t + \text{Deposits}_t + \text{Earnings}_t$$

Where: $\text{Earnings}_t$=interest credited (fixed annuity) or investment return (variable annuity)

$\text{Gross Benefits}_t = \text{Benefits}_t + \text{Charges}$.

The account value can be reported to the owner at any time through periodic reports or upon telephone or internet request. The owner is able to know at all times how the account value is faring. The account value (perhaps reduced by a surrender charge) may be available for withdrawal or surrender or as a death benefit.

Certain embodiments of the invention provide (or may provide) a death benefit which at death pays any remaining account value to the beneficiary.

Certain embodiments of the invention provide (or may provide) a cash surrender value which upon surrender of the contract makes a lump sum payment to the owner equal to the account value at that time, perhaps reduced by a surrender charge.

Certain embodiments of the invention provide (or may provide) for optional additional benefits. For example, long term care (LTC) insurance is one benefit that can be made available to the owner. Charges for any additional benefits may be made under the same charging methods used for the benefit payment guarantee (front end charge, level charge, asset charge) and serve to simply increase the levels of such charges.

Account value calculations reflect the charges for the optional benefits. Also, to the extent benefit payments are made from the account value, account values are reduced accordingly.

Long term care (LTC) benefits serve as an example of one kind of optional benefit. For example, for a charge of 5% of deposits, the following LTC benefit might be provided: if the owner/annuitant is unable to perform 3 of 5 specified "activities of daily living," the normal benefit payment is increased by 50%; this increased benefit is payable as long as the owner/annuitant continues to qualify for the benefit. The increased amount will be deducted from the account value just as any other benefit payment. The increased benefit will more rapidly deplete the account value and shorten the cash surrender period, but under the terms of the coverage, will also result in earlier payment of benefits directly by the insurance company. By simply accelerating the rate at which the account value is paid to the owner/annuitant and making further payments contingent on the owner/annuitant being alive, the financial needs of the owner/annuitant are met at relatively little cost (and therefore a relatively small premium charge) to the insurance company.

Under this example of a LTC benefit, the return of the owner/annuitant to good health will result in reverting to the original benefit level from that time forward. Under that scenario, of course, the account value will still be depleted earlier than initially designed, but payments by the insurer will continue nonetheless.

Because this invention provides an account value, the insurer may also decide to allow partial withdrawals and additional deposits. If either of these types of owner-initiated transactions occurs, the future guaranteed benefit payments must be adjusted accordingly. The adjustment mechanism for these transactions must be contained in the contract language. For example, one adjustment method is simply to decrease (in the case of a withdrawal) or increase (in the case of an additional deposit) the future guaranteed benefits by an amount equal to the benefit which could be purchased by the amount withdrawn or deposited. Such amount can be determined by the methods already described.

From the preceding description of the preferred embodiments, it is evident that the objects of the invention are attained. Although the invention has been described and illustrated in detail, it is to be clearly understood that the same is intended by way of illustration and example only and is not to be taken by way of limitation. The spirit and scope of the invention are to be limited only by the terms of the appended claims.

What is claimed:

1. A data processing method for administering an annuity product having an account value and a guarantee of lifetime payments, comprising the steps of:
   a. establishing a charge for paying the lifetime payments after the account value reaches zero in accordance with the guarantee;
   b. using a computer:
      1. determining an initial benefit payment;
      2. detemining a subsequent periodic benefit payment; and
      3. periodically determining the account value;
   c. periodically paying the initial payment and the subsequent payment and reporting the account value to the beneficiary.

2. The data processing method of claim 1, wherein the step of establishing a charge for the guarantee of lifetime payments further comprises the steps of determining a front end charge and deducting the front end charge from an initial deposit.

3. The data processing method of claim 2, wherein the front end charge is determined based upon at least one of a plurality of factors, including age, sex, liquidity period, and interest rates.

4. The data processing method of claim 2, wherein the initial benefit payment is determined by the following formula:

$$\text{Initial benefit} = \text{Deposit} \times (1 - \text{Charge}) \Big/ \left[ \sum_{t=0}^{12N-1} 1/(1+AIR)^{t/12} \right]$$

Where: Charge=charge for lifetime guarantee (as a percent of deposit)

N=number of years account value is maintained

AIR=assumed investment rate (annual).

5. The data processing method of claim 4, wherein the step of determining the subsequent periodic benefit payment comprises the step of setting the subsequent benefit payment equal to the initial benefit payment.

6. The data processing method of claim 4, wherein the step of determining the subsequent periodic benefit payment comprises the step of setting the subsequent benefit payment equal to the immediately preceding benefit payment.

7. The data processing method of claim 4, wherein the step of determining the subsequent periodic benefit payment comprises the step of setting the subsequent benefit payment equal to the immediately preceding benefit payment increased by a predetermined percentage.

8. The data processing method of claim 4, wherein the subsequent periodic benefit payment is determined by the following formula:

$$\text{Benefit}_{t+1} = \text{Benefit}_t \times (1+I)/(1+AIR)$$

Where: Benefits$_{t+1}$=dollar amount of variable annuity benefit at time t+1

Benefit$_t$=dollar amount of variable annuity benefit at time t

I=actual fund performance during period t to t+1 (as a %)

AIR=assumed investment rate for the period t to t+1 (as a %).

9. The data processing method of claim 1, wherein the step of establishing a charge for the guarantee of lifetime payments further comprises the step of determining a charge to be deducted from each benefit payment.

10. The data processing method of claim 9, wherein the initial benefit payment is determined by the following formula:

$$\text{Initial benefit} = \text{Deposit} \times (1 - \text{Charge}) \Big/ \left[ \sum_{t=0}^{12N-1} 1/(1+AIR)^{t/12} \right]$$

Where: Charge level charge for lifetime guarantee (as a percentage of each benefit payment)

N=number of years account value is maintained.

AIR=assumed investment rate (annual).

11. The data processing method of claim 10, wherein the step of determining the subsequent periodic benefit payment comprises the step of setting the subsequent benefit payment equal to the initial benefit payment.

12. The data processing method of claim 10, wherein the step of determining the subsequent periodic benefit payment comprises the step of setting the subsequent benefit payment equal to the immediately preceding benefit payment.

13. The data processing method of claim 10, wherein the step of determining the subsequent periodic benefit payment comprises the step of setting the subsequent benefit payment equal to the immediately preceding benefit payment increased by a predetermined percentage.

14. The data processing method of claim 10, wherein the subsequent periodic benefit payment is determined by the following formula:

$$\text{Benefit}_{t+1} = [\text{Benefit}_t \times (1+I)/(1+AIR)]$$

Where: $\text{Benefit}_{t+1}$=dollar amount of variable annuity benefit at time t+1

$\text{Benefit}_t$=dollar amount of variable annuity benefit at time t

I=actual fund performance during period t to t+1 (as a %)

AIR=assumed investment rate for the period t to t+1 (as a %).

15. The data processing method of claim 9, wherein the initial benefit payment is determined by the following formula:

$$\text{Initial benefit} = \text{Gross Benefit} - \text{Charge}$$

$$\text{Where: Gross Benefit} = \text{Deposit} \bigg/ \sum_{t=0}^{12N-1} 1/(1+AIR)^{t/12}$$

Charge=level dollar charge from each benefit payment for lifetime guarantee

AIR=Assumed Investment Rate (Annual)

N=number of years account value is maintained.

16. The data processing method of claim 15, wherein the subsequent periodic benefit payment is determined by the following formula:

$$\text{Subsequent Benefit}_{t+1} = \text{Gross Benefit}_{t+1} - \text{Charge}$$

Where: $\text{Gross Benefit}_{t+1} = \text{Gross Benefit}_t \times (1+I)/(1+AIR)$ $\text{Gross Benefit}_{t+1}$=dollar amount of gross variable annuity benefit at time t+1

$\text{Gross Benefit}_t$=dollar amount of gross variable annuity benefit at time t I=actual fund performance during period t to t+1 )as a %)

AIR=assumed investment rate for the period t to t+1 )as a %)

Charge=level dollar charge from each benefit payment for lifetime guarantee.

17. The data processing method of claim 10, wherein the step of determining the subsequent periodic benefit payment comprises the step of setting the subsequent benefit payment equal to the immediately preceding benefit payment.

18. The data processing method of claim 10, wherein the step of determining the subsequent periodic benefit payment comprises the step of setting the subsequent benefit payment equal to the immediately preceding benefit payment increased by a predetermined percentage.

19. The data processing method of claim 10, wherein the step of determining the subsequent periodic benefit payment comprises the step of setting the subsequent benefit payment equal to the initial benefit payment.

20. The data processing method of claim 10, wherein the step of determining the subsequent benefit payment comprises the step of setting the subsequent benefit payment equal to the initial benefit payment increased by a predetermined percentage.

21. The data processing system of claim 1, wherein the step of establishing a charge for the guarantee of lifetime payments further comprises the steps of determining an asset charge and periodically deducting the asset charge from the account value.

22. The data processing method of claim 21, wherein the step of deducting the asset charge from the account value comprises the step of applying a lower crediting rate in the periodic determination of the account value.

23. The data processing method of claim 21, wherein the initial benefit payment is determined by the following formula:

$$\text{Initial Benefit} = \text{Deposit} \bigg/ \sum_{t=0}^{12N-1} 1/(1+AIR)^{t/12}$$

Where: AIR=assumed investment rate (annual).

N=number of years account value is maintained.

24. The data processing method of claim 23, wherein the step of determining the subsequent benefit payment comprises the step of setting the subsequent benefit payment equal to the initial benefit payment.

25. The data processing method of claim 23, wherein the step of determining the subsequent benefit payment comprises the step of setting the subsequent benefit payment equal to the immediately preceding benefit payment.

26. The data processing method of claim 23, wherein the step of determining the subsequent periodic benefit payment comprises the step of setting the subsequent benefit payment equal to the immediately preceding benefit payment increased by a predetermined percentage.

27. The data processing method of claim 23, wherein the subsequent benefit payments are determined by the following formula:

$$\text{Benefit}_{t-1} = \text{Benefit}_t \times (1+I)/(1+AIR)$$

Where: $\text{Benefit}_{t+1}$=dollar amount of variable annuity benefit at time t+1

$\text{Benefit}_t$=dollar amount of variable annuity benefit at time t

I=actual fund performance during period t to t+1 (as a %), reduced by the daily asset charge for the guarantee AIR=assumed investment rate for the period t to t+1 (as a %).

28. The data processing method of claim 1, comprising the additional step of providing at least one of a death benefit and a cash surrender benefit.

29. The data processing method of claim 28, wherein at least one of the death benefit and the cash surrender benefit is related to the account value.

30. The data processing method of claim 29, wherein the death benefit is equal to the account value.

31. The data processing method of claim 29, wherein the cash surrender benefit is equal to the account value, reduced by an optional surrender charge.

32. The data processing method of claim 1, wherein the account value is periodically determined by the following formula:

$$\text{Account value}_t = \text{Account value}_{t-1} - \text{Withdrawals}_t - \text{Gross Benefit}_t + \text{Deposits}_t + \text{Earnings}_t$$

Where: $\text{Earnings}_t$=interest credited (fixed annuity) or investment return (variable annuity)

$\text{Gross Benefits}_t = \text{Benefit}_t + \text{Charges}_t$.

33. The data processing method of claim 1, wherein the account value is determined throughout the period between the periodic reports to the beneficiary, and may be accessed upon demand by the beneficiary.

34. The data processing method of claim 1, wherein the annuity product has a long term care insurance benefit, and further comprising the step of determining a charge for the long term care insurance benefit.

35. The data processing method of claim 34, wherein the charge for the long term care insurance benefit is determined in the same manner as the charge for the guarantee of lifetime payments.

36. The data processing method of claim 1, further comprising the steps of providing for partial withdrawals or additional deposits by the beneficiary, and redetermining the subsequent periodic benefit payment in the event of a partial withdrawal or additional deposit.

* * * * *

UNITED STATES PATENT AND TRADEMARK OFFICE
CERTIFICATE OF CORRECTION

PATENT NO.    : 6,611,815 B1
DATED         : August 26, 2003
INVENTOR(S)   : Stephen H. Lewis and Denis G. Schwartz It is certified that error appears in the above-identified patent and that said Letters Patent is hereby corrected as shown below:

<u>Column 13,</u>
Lines 40-55, should read:
-- What is claimed:
   1. A data processing method for administering an annuity product having an account value and a guarantee of lifetime payments, comprising the steps of:

a. establishing a charge for paying lifetime payments after the account value reaches zero in accordance with the guarantee;

b. using a computer:

1. determining an initial benefit payment;
      2. determining a subsequent periodic benefit payment; and
      3. periodically determining the account value;

c. periodically paying the initial payment and the subsequent payment and reporting the account value to the beneficiary. --

Signed and Sealed this

Twenty-seventh Day of July, 2004

JON W. DUDAS
*Acting Director of the United States Patent and Trademark Office*